United States Patent [19]

Yoshida et al.

[11] Patent Number: 5,615,033
[45] Date of Patent: Mar. 25, 1997

[54] OPTICAL SIGNAL TRANSMISSION APPARATUS AND METHOD

[75] Inventors: Rutsuko Yoshida; Yuzuru Ishioka, both of Kawasaki, Japan

[73] Assignee: Fujitsu Limited, Kanagawa, Japan

[21] Appl. No.: 510,829

[22] Filed: Aug. 3, 1995

[30] Foreign Application Priority Data

Sep. 27, 1994 [JP] Japan .................................. 6-231047

[51] Int. Cl.⁶ .................................................. H04B 10/08
[52] U.S. Cl. .................................................. 359/110
[58] Field of Search .................................. 359/110, 177, 359/179, 173, 161, 181, 182.12, 182, 182.22; 356/73.1; 379/412, 413; 361/59, 71, 72, 73, 107

[56] References Cited

U.S. PATENT DOCUMENTS

| | | | |
|---|---|---|---|
| 4,313,224 | 1/1982 | Wakabayashi et al. | 359/177 |
| 4,996,683 | 2/1991 | Yamashita et al. | 370/4 |
| 5,099,349 | 3/1992 | Yoshida et al. | 359/161 |
| 5,278,686 | 1/1994 | Grasso et al. | 359/110 |
| 5,315,674 | 5/1994 | Asako | 385/15 |
| 5,355,250 | 11/1994 | Grasso et al. | 359/177 |

FOREIGN PATENT DOCUMENTS

| | | | |
|---|---|---|---|
| 0382243 | 8/1990 | European Pat. Off. | H04B 10/14 |
| 0644667 | 3/1995 | European Pat. Off. | H04B 10/08 |

*Primary Examiner*—Wellington Chin
*Assistant Examiner*—Rafael Bacares

[57] ABSTRACT

An optical signal transmission apparatus is disclosed. The apparatus includes an optical signal receiving section receiving a first optical signal through a first optical cable and an optical signal transmitting section transmitting a second optical signal through a second optical cable. The apparatus further includes a control section for stopping the optical signal transmitting section from transmitting the second optical signal when an abnormal condition in the first optical signal is detected.

17 Claims, 14 Drawing Sheets

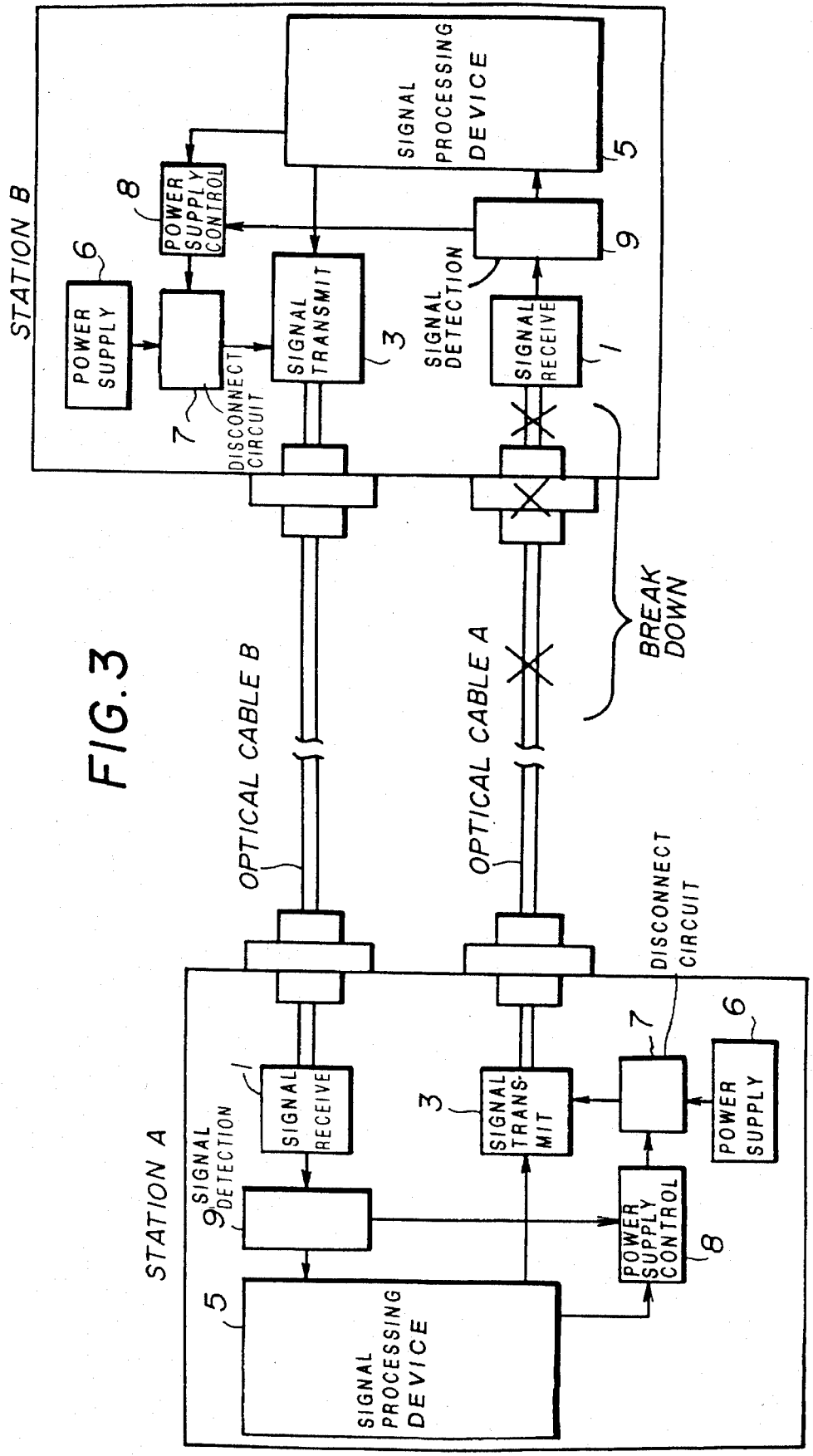

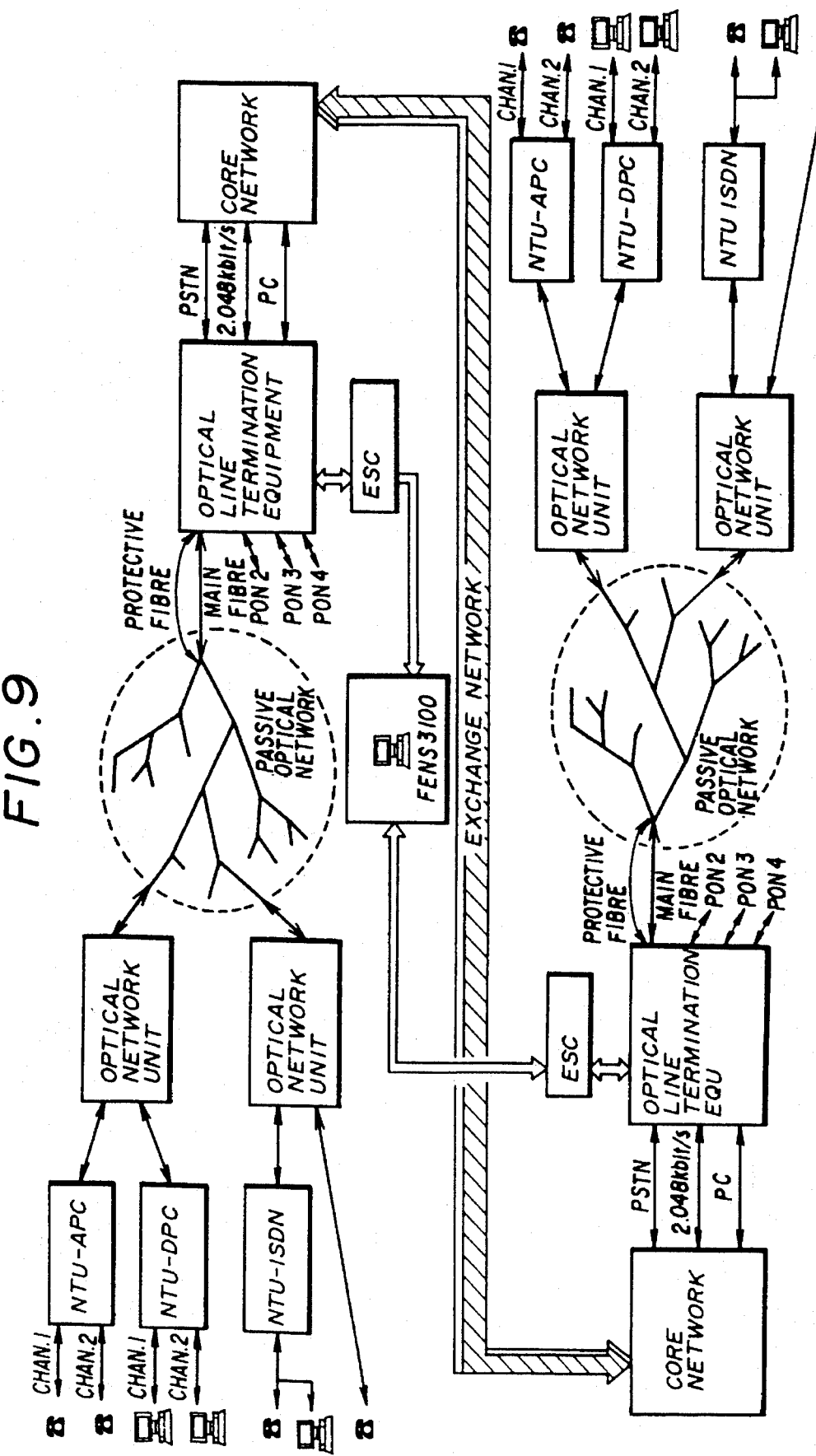

5,615,033

OPTICAL SIGNAL TRANSMISSION APPARATUS AND METHOD

BACKGROUND OF THE INVENTION

1. Field of the Invention

The present invention generally relates to an optical signal transmission apparatus and method, and more particularly, to an optical signal transmission apparatus and method in which a greater safety is ensured.

In an optical transmission system, in general, optical signals whose optical wavelengths are nearly 1.5 μm or 1.3 μm are used. At these wavelengths, a transmission loss of an optical cable is minimum. Since these optical signals are not visible rays, it is difficult for a maintenance worker to discriminate whether or not an optical signal is being transmitted through the optical cable. Therefore, a conventional optical transmission apparatus is constructed such that it permits the optical cable to be disconnected only when a power supply is turned off. However, when a breaking down of the optical cable is caused, the optical signal is emitted from a disconnected section to the air. As a result, there is a problem that neighboring humans and animals may be in danger of, for example, losing of their eyesight.

2. Description of the Prior Art

FIG. 1 shows a configuration of the conventional optical transmission apparatus. The apparatus is constructed with a housing 100, a power supply section 101, an optical signal operating section 102 consisting of an optical signal transmission section 103 and a connection part 104, an optical cable 105, and a power supply connector 106.

In the apparatus, the power supply section 101 and the optical signal operating section 102 are located within the housing 100, and the power supply section 101 is connected with the optical signal operating section 102 by the power supply connector 106. From the power supply section 101, operating power is supplied to the optical signal operating section 102 through the power supply connector 106. Thereby, an optical signal is emitted from a luminous device of a semiconductor laser, etc., in the optical signal transmission section 103, and is transmitted to the optical cable 105 through the connection part 104.

In this configuration, when connecting and disconnecting the optical cable 105 to and from the optical signal transmission section 103 by the connection part 104, the connecting and disconnecting operations cannot be performed if the optical signal operating section 102 is not pulled out from the housing 100. In this case, when the optical signal operating section 102 is pulled out from the housing 100, the power supply connector 106 is disconnected, and the power from the power supply section 101 stops being supplied to the optical signal operating section 102. Therefore, light emission from the luminous device in the optical signal transmission section 103 stops completely. In this condition, the connecting and disconnecting operations for the optical cable 105 can be performed. After these operations are finished, when putting the optical signal operating section 102 into the housing 100, the optical signal operating section 102 is connected with the power supply section 101 through the power supply connector 106, and the light emission of the luminous device in the optical signal transmission section 103 is permitted. In the above manner, the maintenance worker is prevented from being in danger.

As mentioned above, in the conventional optical signal transmission apparatus, when connecting and disconnecting the optical cable 105, the optical signal operating section 102 is automatically disconnected from the power supply section 101 to stop the light emission during the maintenance. However, after the maintenance is finished, the optical signal is emitted regardless of a maintenance condition for the opposite optical signal transmission apparatus in the opposite station. There is a problem that a maintenance worker in the opposite station may be in danger. Further, the breaking down of the optical cable 105 may be caused, and the optical signal may be radiated from the disconnected section to the air. Since, this optical signal is not a visible ray, it is very difficult to discriminate the radiated optical signal in the air. Therefore, even if the power of the optical signal is small, for example, several mW, the intensity of the optical signal is very strong since the optical signal is the laser light. Therefore, people or animals may be in danger of losing their eyesight, etc., due to their retinas being effected by the optical signal.

SUMMARY OF THE INVENTION

It is an object of this invention to provide an optical signal transmission apparatus and method. In the apparatus and method, when an abnormal condition in an optical cable, for example, a snapping of the cable, is detected, light emission is stopped to prevents dangerous situation. A recovery process for the light emission is easily operated. This permits the disadvantages described above to be eliminated.

The object described above is achieved by an optical signal transmission apparatus comprising: an optical signal receiving section receiving a first optical signal through a first optical cable; an optical signal transmitting section transmitting a second optical signal through a second optical cable; and a control section for stopping the optical signal transmitting section from transmitting the second optical signal when an abnormal condition in the first optical signal is detected.

In the apparatus mentioned above, the control section comprises a disconnecting circuit interrupting power supplied to the optical signal transmitting section; and a power supply control section controlling the disconnecting circuit to interrupt the power to the optical signal transmitting section to stop transmitting the second optical signal when the abnormal condition of the first optical signal is detected.

According to the apparatus mentioned above, when the abnormal condition of the first optical signal is detected, the control section stops the optical signal transmitting section from transmitting the second optical signal. Therefore, for example, when an optical fiber breaks down, humans and animals are prevented from being exposed to invisible light.

In the apparatus mentioned above, the control section further may comprise a signal detection section detecting the abnormal condition of the first optical signal. The signal detection section supervises a receive signal level and a synchronization state of the receive signal, and discriminates the abnormal condition in the optical cable when the receive signal level is less than a given value or the synchronization is unlocked.

The object described above is also achieved by the apparatus mentioned above, wherein the control section further comprises a radiation switch controlling the disconnecting circuit to supply the power to the optical signal transmitting section when the second optical signal needs to be transmitted.

After the abnormal condition is removed or when a transmission system starts to be operated, by turning the radiation switch on, the disconnecting circuit is controlled to supply the power to the optical signal transmitting section. Accordingly, the second optical signal is transmitted to the second station, and the optical signal transmission is started again.

In the apparatus mentioned above, the control section further comprises a radiation timer maintaining a connecting condition in the disconnecting circuit for a given first time. By including the radiation timer, the disconnecting circuit may be maintained in the connecting condition to transmit the second optical signal by itself until the signal detection section detects a normal condition in the first optical signal.

The object described above is also achieved by the apparatus mentioned above, wherein the control section further comprises: a radiation start timer starting the connecting condition in the disconnecting circuit after a second given time; and a radiation control section starting the radiation timer in response to time out of the radiation start timer. In the apparatus mentioned above, the control section further comprises a remote communication section remote-controlling the radiation timer and the radiation start timer.

According to the apparatus mentioned above, after the second given time of the radiation start timer passes, the radiation timer is started to transmit the second optical signal. Therefore, for example, a maintenance worker may move to a desired position during the second given time.

The object described above is also achieved by the apparatus mentioned above, wherein the control section further comprises a reflection detection section detecting a reflected light component from the second optical cable; wherein the power supply control section controls the disconnecting circuit to interrupt the power to the optical signal transmitting section to stop transmitting the second optical signal when a level of the reflected light component detected in the reflection detection section is equal to or larger than a given reflection value.

In a normal condition of the second optical cable, the reflected light component is small. When the optical cable is disconnected upon breaking down, a face generated by disconnection is similar to a mirror in which the reflected light component becomes large. According to the apparatus mentioned above, the reflection detection section may detect disconnection of the optical cable by detecting the reflected light component. When the reflection detection section detects the disconnection of the optical cable, the power supply control section controls the disconnecting circuit to stop supplying the power to the optical signal transmitting section. Therefore, radiation of the invisible light from a disconnected part is stopped, thereby preventing the humans and animals from being in danger.

The apparatus mentioned above may be located in a subscriber side or a network side of a transmission system which performs bidirectional communication through optical cables between the subscriber and the network.

The object described above is also achieved by a method of transmitting a first optical signal from a first station to a second station through a first optical cable and transmitting a second optical signal from the second station to the first station through a second optical cable, the method comprising the steps of: (a) stopping the second station from transmitting the second optical signal to the first station when an abnormal condition in the first optical signal is detected in the second station; and (b) stopping the first station from transmitting the first optical signal to the second station when an abnormal condition in the second optical signal is detected in the first station.

The method mentioned above further may comprise a step of (c) controlling the first station to transmit manually the first optical signal to the second station for a given period.

Other objects and further features of the present invention will be apparent from the following detailed description when read in conjunction with the accompanying drawings.

BRIEF DESCRIPTION OF THE DRAWINGS

FIG. 3 shows a system configuration using the optical signal transmission apparatus shown in FIG. 2A;

FIG. 9 shows an example of a configuration of an optical subscriber transmission system.

DESCRIPTION OF THE PREFERRED EMBODIMENTS

Figure 1:
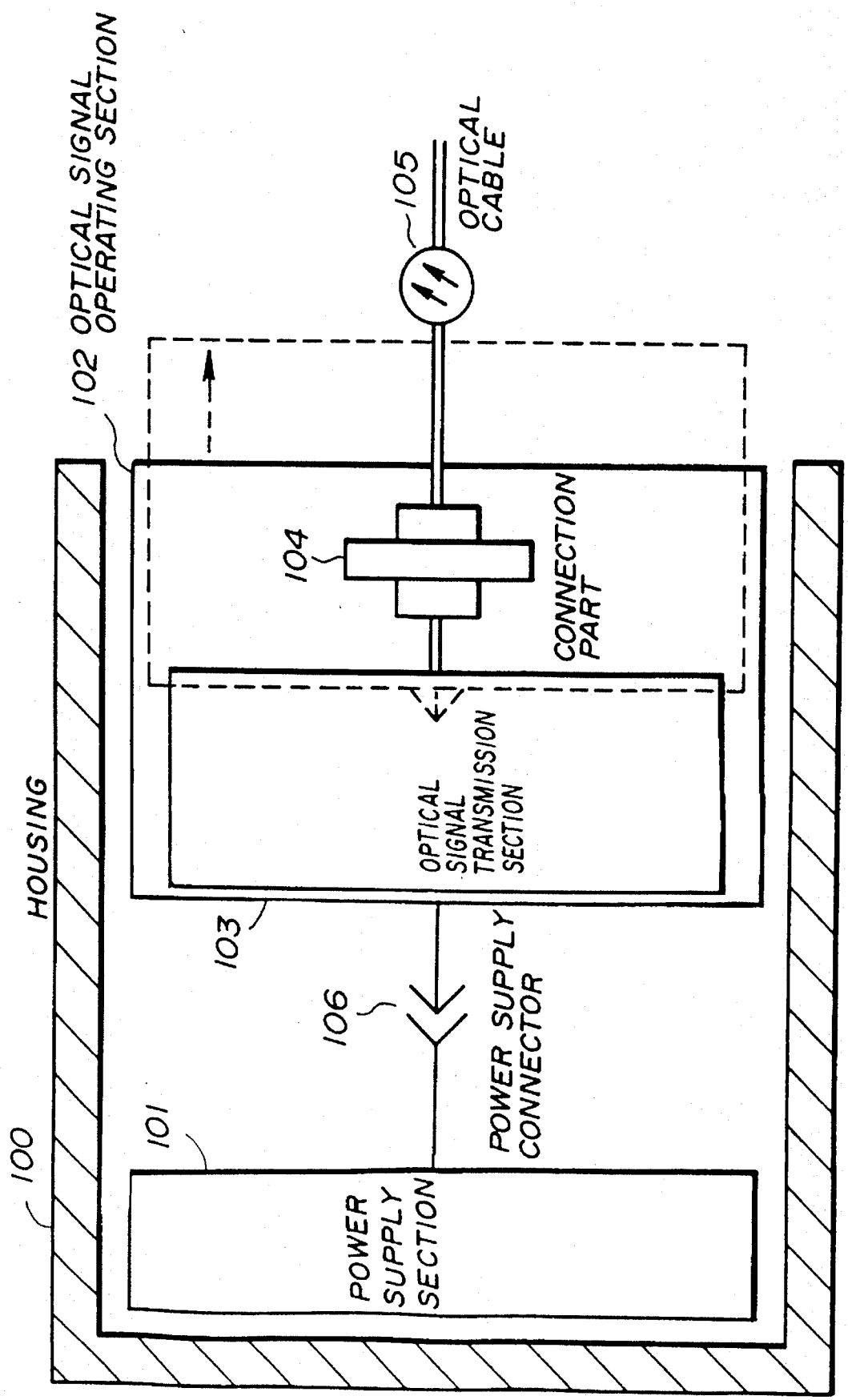
FIG. 1 shows a configuration of a conventional optical transmission apparatus.
Figure 2A:
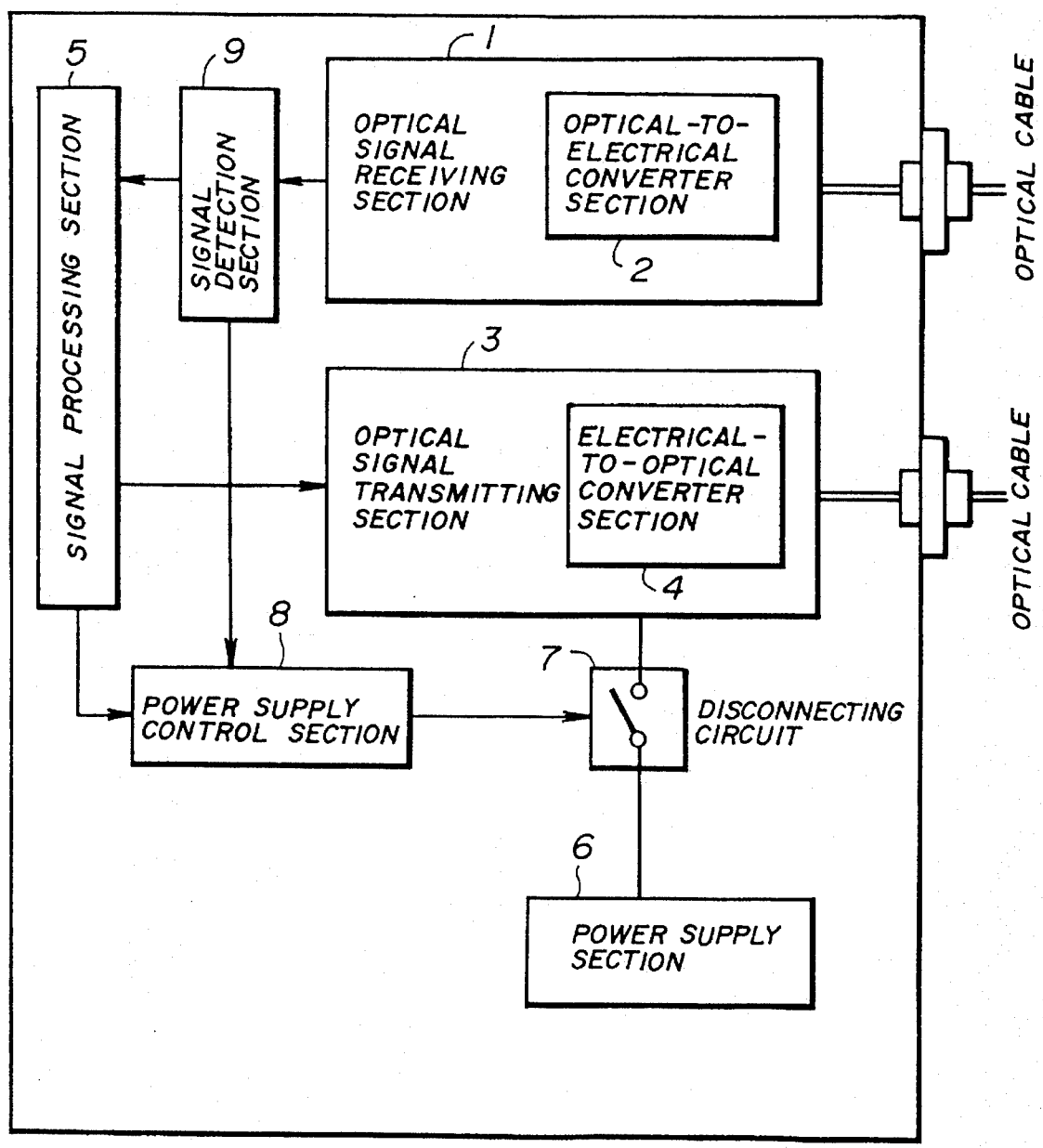
FIG. 2A shows a block diagram for explaining an operation principle of an optical signal transmission apparatus according to the present invention.
Figure 2B:
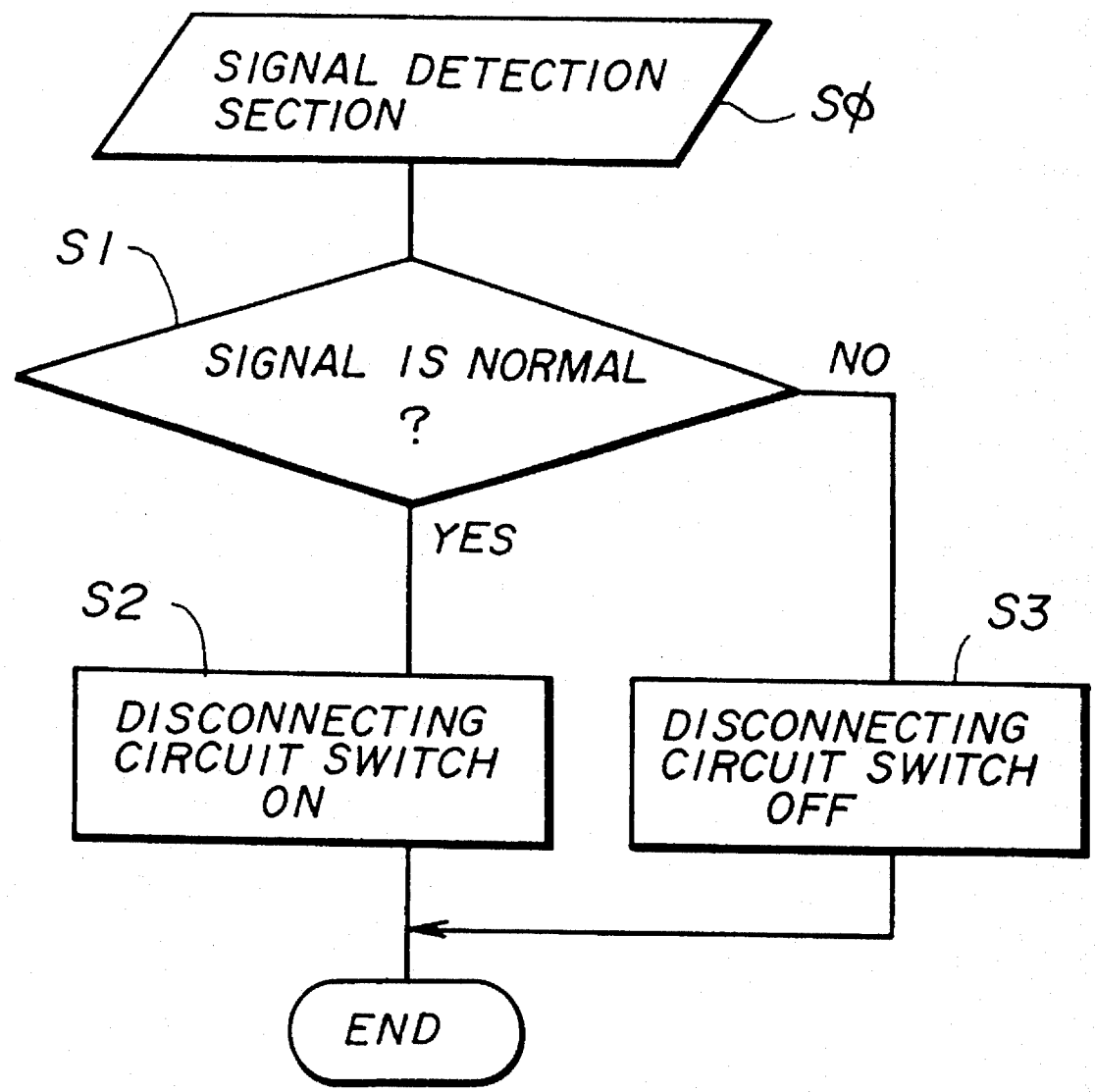
FIG. 2B shows a flowchart for explaining an operation principle of the optical signal transmission apparatus shown in FIG. 2A.

First, a description will be given of an operation principle of an optical signal transmission apparatus according to the present invention, by referring to FIGS. 2A, 2B. FIG. 2A shows a block diagram for explaining the operation principle of the optical signal transmission apparatus according to the present invention. FIG. 2B shows a flowchart for explaining an operation principle of the optical signal transmission apparatus shown in FIG. 2A. The optical signal transmission apparatus comprises an optical signal receiving section 1, an optical signal transmitting section 3, a signal processing section 5, and a power supply section 6. The optical signal receiving section 1 comprises an optical-to-electrical converter section 2 converting a received optical signal through an optical cable to an electrical signal. The optical signal transmitting section 3 comprises an electrical-to-optical converter section 4 converting an electrical signal to an optical signal to be transmitted to an optical cable. The signal processing section 5 processes transmit and receive signals.

The optical signal transmission apparatus may further include a signal detection section 9 for detecting an abnormal condition of the optical cable, and a disconnecting circuit 7 and a power supply control section 8 for disconnecting the power supply section 6.

In the optical signal receiving section 1, by the optical-to-electrical converter section 2 with a photodiode, etc., the optical signal coming from the opposite station through the optical cable is converted to the electrical signal which is received and processed in the signal processing section 5. The transmit signal generated in the signal processing section 5 is converted to the optical signal by the electrical-to-optical converter section 4 with a semiconductor laser, etc., which is transmitted to the opposite station through the optical cable.

When the abnormal condition in the received optical signal through the optical cable is detected by the signal detection section 9, etc., the optical signal transmission from the optical signal transmitting section 3 is controlled to stop (step S3 in FIG. 2A). Stopping the optical signal transmission is performed by shutting the optical signal with an optical shutter, stopping the electrical transmit signal from the signal processing section 5, and stopping a supply of a bias voltage to a luminous device such as a semiconductor laser, etc.

FIG. 3 shows a system configuration using the optical signal transmission apparatus shown in FIG. 2A. The system is constructed with a station A and a station B, in which the optical signal transmission apparatus according to the present invention is respectively located. The system A and system B are connected to each other through optical cables A and B. The optical signal generated in the optical signal transmitting section 3 of the station A is transmitted to the optical signal receiving section 1 of the station B through the optical cable A. The optical signal generated in the optical signal transmitting section 3 of the station B is transmitted to the optical signal receiving section 1 of the station A through the optical cable B.

If the optical fiber A breaks down at one of positions shown by a numeral "x", the signal detection section 9 in the station B detects the abnormal condition in the received optical signal. Therefore, the station B stops transmitting the optical signal from the optical signal transmitting section 3 to the optical cable B.

Since the optical signal from the station B is not received in the station A, the signal detection section 9 in the station A detects the abnormal condition in the received optical signal. Then, the station A stops transmitting the optical signal from the optical signal transmitting section 3 of the station A to the optical cable A.

By the above procedures, even if the optical cable A is broken near a maintenance worker, the maintenance worker is prevented from receiving a high-intensity optical signal.

Figure 4A:
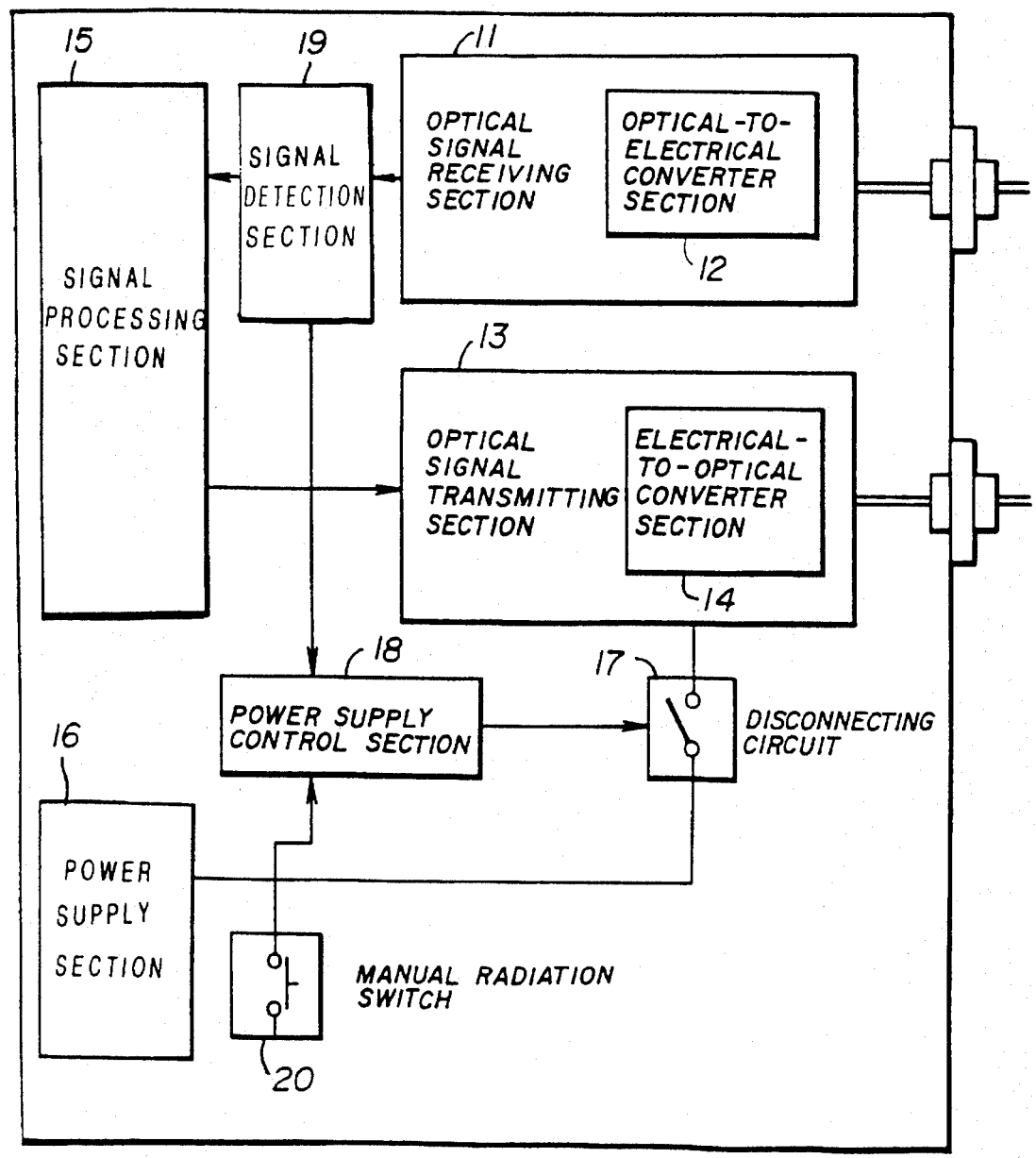
FIG. 4A shows a block diagram of a first embodiment of the optical signal transmission apparatus according to the present invention.
Figure 4B:
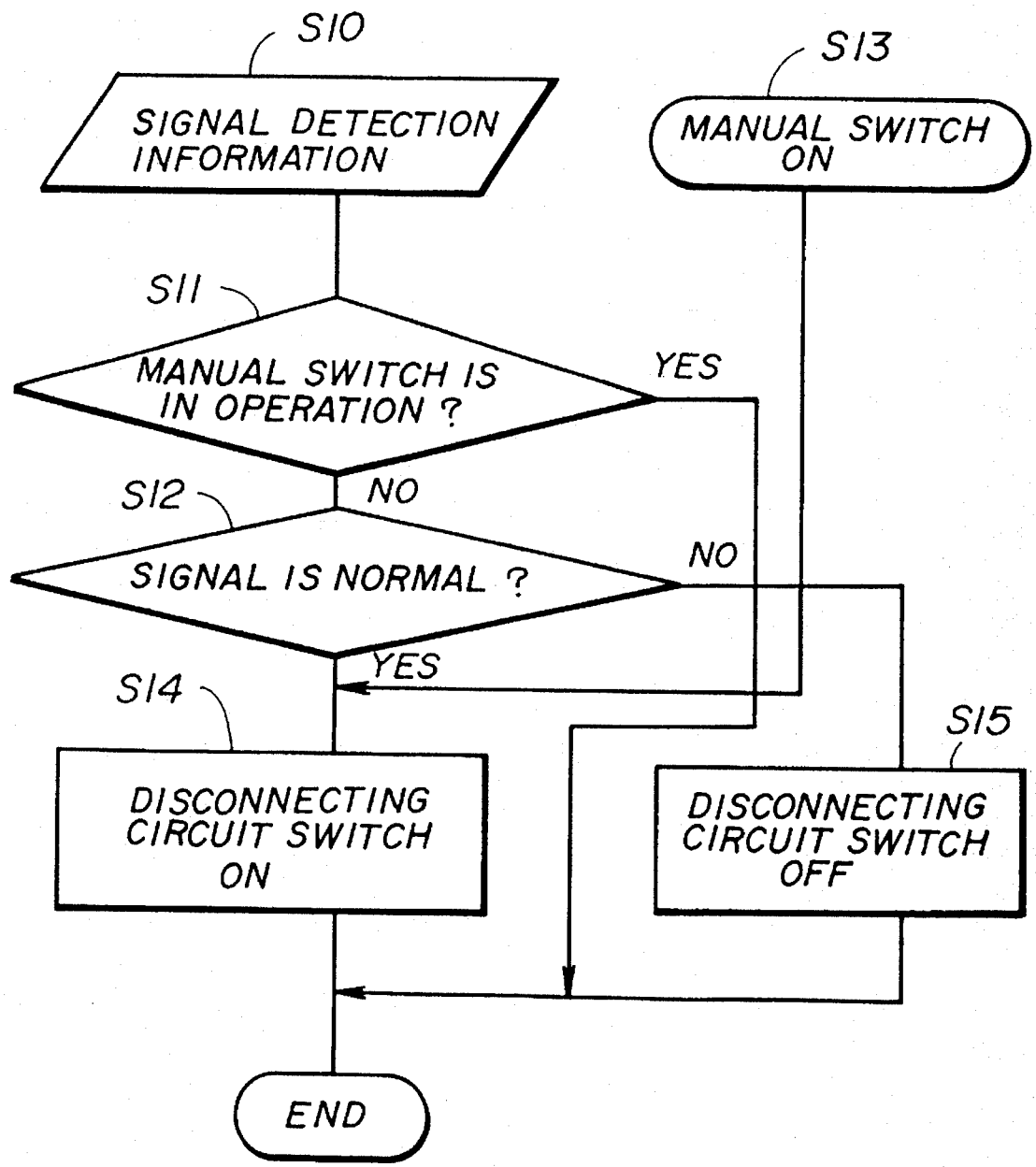
FIG. 4B shows a flowchart for explaining an operation of the optical signal transmission apparatus shown in FIG. 4A.

Next, a description will be given of a first embodiment of the optical signal transmission apparatus according to the present invention, by referring to FIGS. 4A, 4B. FIG. 4A shows a block diagram of the first embodiment of the optical signal transmission apparatus according to the present invention. FIG. 4B shows a flowchart for explaining an operation of the optical signal transmission apparatus shown in FIG. 4A. The optical signal transmission apparatus comprises an optical signal receiving section 11, an optical signal transmitting section 13, a signal processing section 15, a power supply section 16, a disconnecting circuit 17, a power supply control section 18, and a signal detection section 19. The optical signal receiving section 11 comprises an optical-to-electrical converter section 12, the optical signal transmitting section 13 comprises an electrical-to-optical converter section 14. The apparatus further comprises a manual radiation switch 20. The apparatus is connected with the same type optical signal transmission apparatus in the opposite station through the optical connectors and the optical cables.

In a normal connecting condition, the disconnecting circuit 17 is in a connecting state, and an operating power supply is supplied to the optical signal transmitting section 13 from the power supply section 16. In the electrical-to-optical converter section 14 with the luminous device such as the semiconductor laser, the electrical signal from the single processing section 15 is converted to the optical signal which is transmitted to the opposite station through the optical cable. To each section except for the optical signal transmitting section 13, the operating power is directly supplied from the power supply section 16. The optical-to-electrical converter section 12 in the optical signal receiving section 11 always converts the optical signal transmitted from the opposite station through the optical cable to the electrical signal.

The electrical signal from the optical-to-electrical converter section 12 is applied to the signal processing section 15 through the signal detection section 19 to be received and processed. A processed electrical signal is further transmitted to a higher layer apparatus such as a processor or another transmission network (not shown).

The transmit signal which was processed in the signal processing section 15 is converted to the optical signal by the electrical-to-optical converter section 14 with the luminous device such as the semiconductor laser in the optical signal transmitting section 13, and is transmitted to the opposite station through the optical cable.

The signal detection section 19 supervises a receive signal level and a synchronous state such as a frame synchronization. For example, when the receive signal level drops down to equal to or less than a given value, or when an out of synchronization is detected, or when both of them simultaneously occur, the signal detection section 19 informs the power supply control section 18 that the abnormal condition occurred. In response to the information of the occurrence of the abnormal condition, the power supply control section 18 controls the disconnecting circuit 17 to open the switch (step S15 in FIG. 4B).

By the disconnecting circuit 17, the operating power supplied to the optical signal transmitting section 13 from the power supply section 16 is cut. Therefore, the electrical-to-optical converter section 14 in the optical signal transmitting section 13 stops transmitting the optical signal.

If the optical cable breaks down between the station and the opposite station, the abnormal conditions such as the dropping of the receive signal level and the out of synchronization may be detected. Therefore, the operating power is stopped from being supplied to the optical signal transmitting section 13 by the disconnecting circuit 17. Thus, an invisible optical signal is not radiated from the broken section of the optical cable, thereby preventing the neighboring humans and animals from being in danger.

The optical signal receiving section 11 includes an AGC circuit, etc., to maintain the electrical signal level at a given value against fluctuation of the optical signal level from the opposite station. When the optical signal level is extremely reduced due to the breaking down of the optical cable, the optical signal receiving section 11 may not maintain the electrical signal level at the given level. Therefore, when the electrical signal level is reduced to equal to or less than the given value, it may be determined that the breaking down of the optical cable or any trouble in the opposite station has been caused.

When the optical cable is disconnected, an external light may enter into the disconnected part of the optical cable. In this case, the electrical signal level may be maintained at the given level. However, since the electrical signal is a noise signal, it is difficult to establish the synchronization such as a frame synchronization. This causes the out of synchronization. Therefore, the synchronizing process is carried out again. When the synchronization is not established even if the synchronizing process is repeated at a given frequency, it may be determined that the breaking down of the optical cable or any trouble in the opposite station has been caused. The synchronization process can be performed in the signal processing section 15.

As mentioned above, when the electrical signal level is reduced to equal to or less than the given level or when the out of synchronization occurs, it is determined that the disconnecting of the optical cable or the trouble in the opposite station has been caused. Therefore, the optical signal stops being transmitted to the optical cable. Accordingly, the radiation of the invisible optical signal from the disconnected part of the optical cable stops, so that the humans and animals are prevented from being in danger.

After the abnormal condition is removed and when the optical signal is transmitted again, or when the system starts up, first, the stable optical signal from the opposite station needs to be received. In this case, it is determined that the normal condition has returned or the system started up perfectly, and thus, the optical signal is transmitted to the opposite station again. And also in the opposite station, when the stable optical signal is received, it is determined that the normal condition has returned or the system started up perfectly. Thus, the optical signal is transmitted from the opposite station again. To perform the above procedures, it is necessary to initially transmit the optical signal from at least one station.

For the above purpose, the manual radiation switch 20 is connected to the power supply control section 18. After the removal of the abnormal condition or the opposite station condition at the starting up is confirmed, the manual radiation switch 20 is turned on (step S13 in FIG. 4B). As a result, the power supply control section 18 controls the disconnecting circuit 17 to be in the connecting condition (step S14 in FIG. 4B). Thus, the operating power from the power supply section 16 is supplied to the optical signal transmitting section 13, and the optical signal is transmitted from the electrical-to-optical converter section 14 to the opposite station through the optical cable. In the opposite station, after the optical signal is received, when the given level for the electrical signal is detected or when the synchronization such as a frame synchronization is established, the optical signal is transmitted.

The optical signal through the optical cable is received in the optical signal receiving section 11, and is converted to the electrical signal in the optical-to-electrical converter section 12. When the given level for the electrical signal is detected or when the synchronization such as a frame synchronization is established, the power supply control section 18 maintains the disconnecting circuit 17 at the connecting condition, even if the manual radiation switch 20 is turned off. Accordingly, the optical signals are transmitted again through the optical cable between the opposite stations.

Figure 5A:
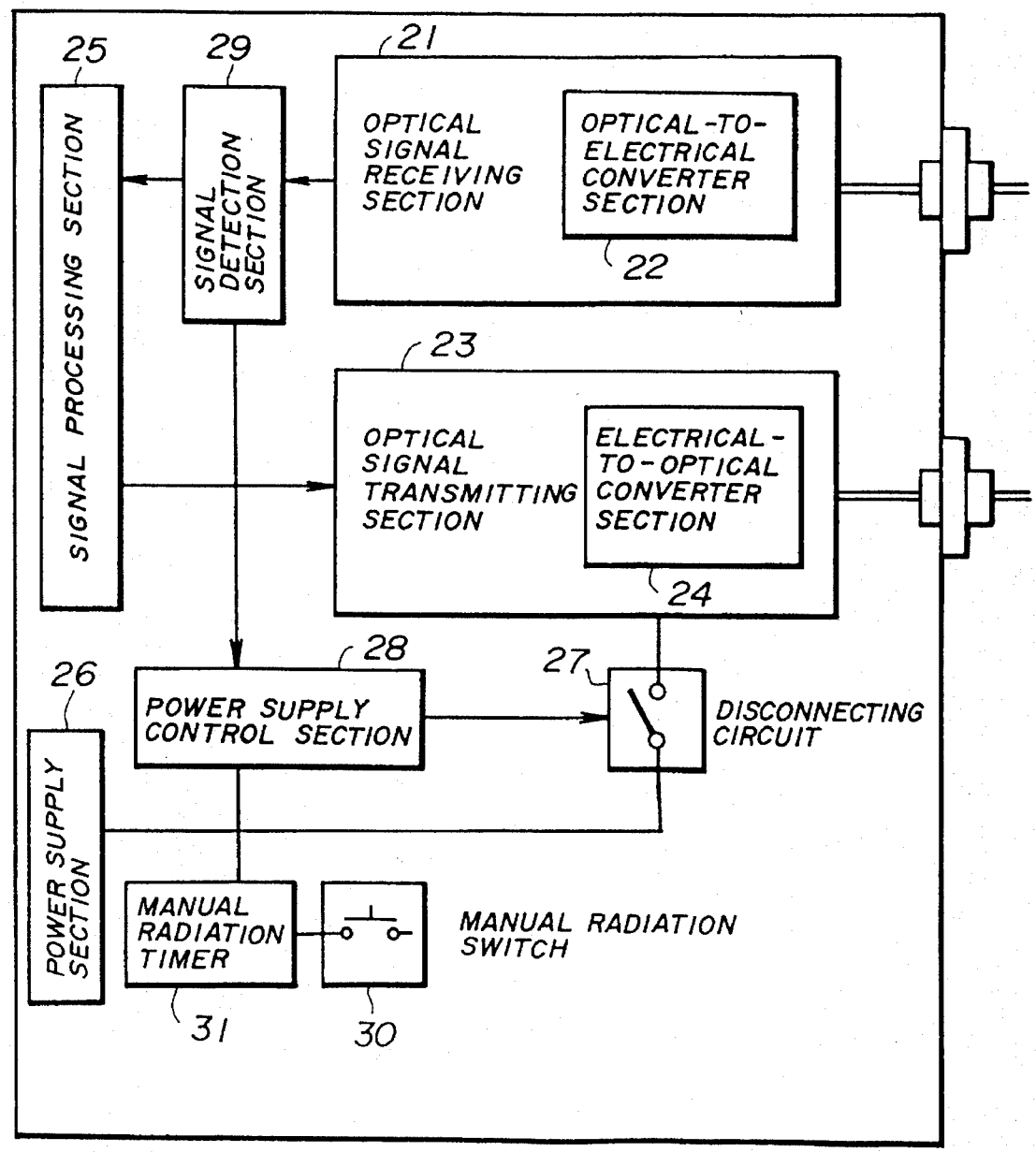
FIG. 5A shows a block diagram of a second embodiment of the optical signal transmission apparatus according to the present invention.
Figure 5B:
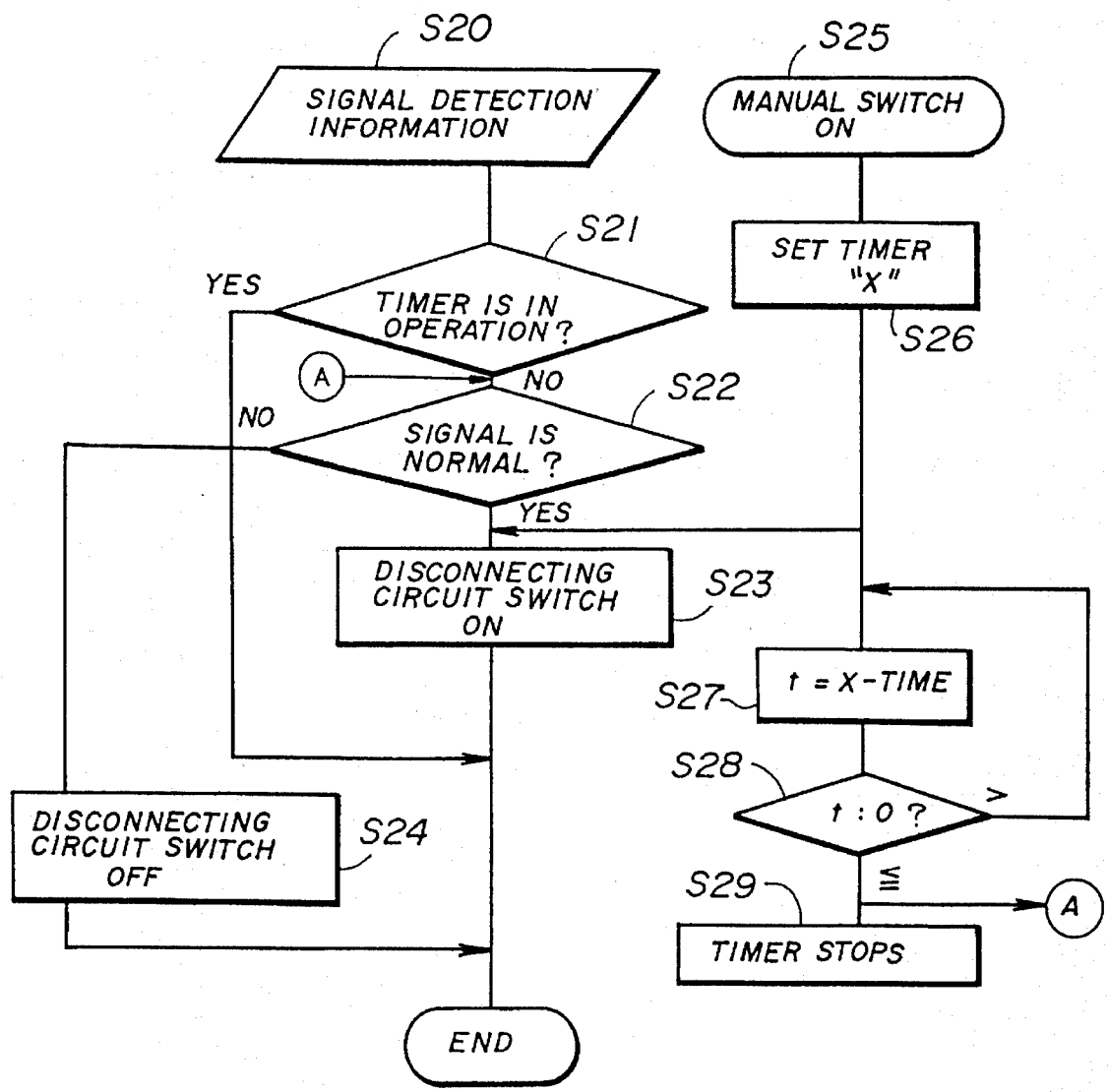
FIG. 5B shows a flowchart for explaining an operation of the optical signal transmission apparatus shown in FIG. 5A.

Next, a description will be given of a second embodiment of the optical signal transmission apparatus according to the present invention, by referring to FIGS. 5A, 5B. FIG. 5A shows a block diagram of the second embodiment of the optical signal transmission apparatus according to the present invention. FIG. 5B shows a flowchart for explaining an operation of the optical signal transmission apparatus shown in FIG. 5A. The optical signal transmission apparatus comprises an optical signal receiving section 21, an optical signal transmitting section 23, a signal processing section 25, a power supply section 26, a disconnecting circuit 27, a power supply control section 28, a signal detection section 29, and a manual radiation switch 30. The optical signal receiving section 21 comprises an optical-to-electrical converter section 22, the optical signal transmitting section 23 comprises an electrical-to-optical converter section 24. The apparatus further comprises a manual radiation timer 31.

The second embodiment of the optical signal transmission apparatus is constructed by adding the manual radiation timer 31 to the first embodiment thereof. In the first embodiment, when starting the system or after removing the abnormal condition, the manual radiation switch 20 needs to be maintained at the turned-on condition until the stable optical signal from the opposite station is received.

In the second embodiment, when the manual radiation switch 30 is turned on (step S25 in FIG. 5B), the manual radiation timer 31 starts to operate (step S26 in FIG. 5B). Until time-out of the manual radiation timer 31 (step S29), the manual radiation timer 31 continues to supply a condition that the manual radiation switch 30 is turned on to the power supply control section 28. Thus, the power supply control section 28 controls the disconnecting circuit 27 to be in the connecting condition (step S23). The operating power from the power supply section 26 is supplied to the optical signal transmitting section 23, and the optical signal is transmitted from the electrical-to-optical converter section 24 to the opposite station through the optical cable.

In the opposite station, the optical signal through the optical cable is stably received, and the optical signal is transmitted again. In the station on this side, when the optical signal from the opposite station is received, the signal detection section 29 stops informing the power supply control section 28 that the abnormal condition has occurred. Therefore, even if the manual radiation switch 30 is turned off, the power supply control section 28 controls the disconnecting circuit 27 to be in the connecting condition. Accordingly, the timer of the manual radiation timer 31 is set to, for example, an interval from the start of the operation of the optical signal transmitting section 23, through the stable reception in the optical signal receiving section 21 of the optical signal from the opposite station, to the time when the signal detection section 29 stops informing the power supply control section 28 that the abnormal condition has occurred. In practical use, a margin is added to the interval.

Figure 6A:
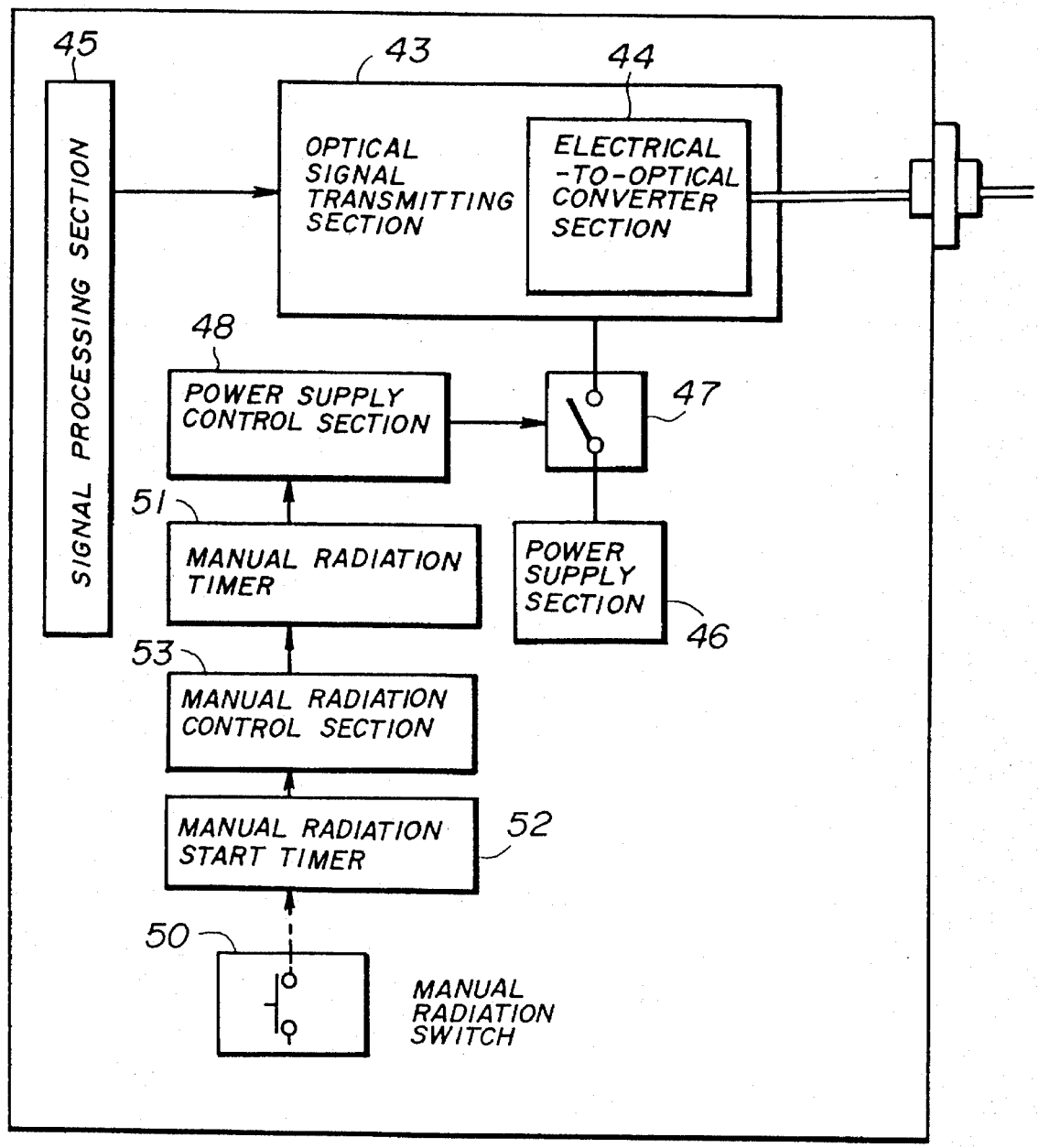
FIG. 6A shows a block diagram of a third embodiment of the optical signal transmission apparatus according to the present invention.
Figure 6B:
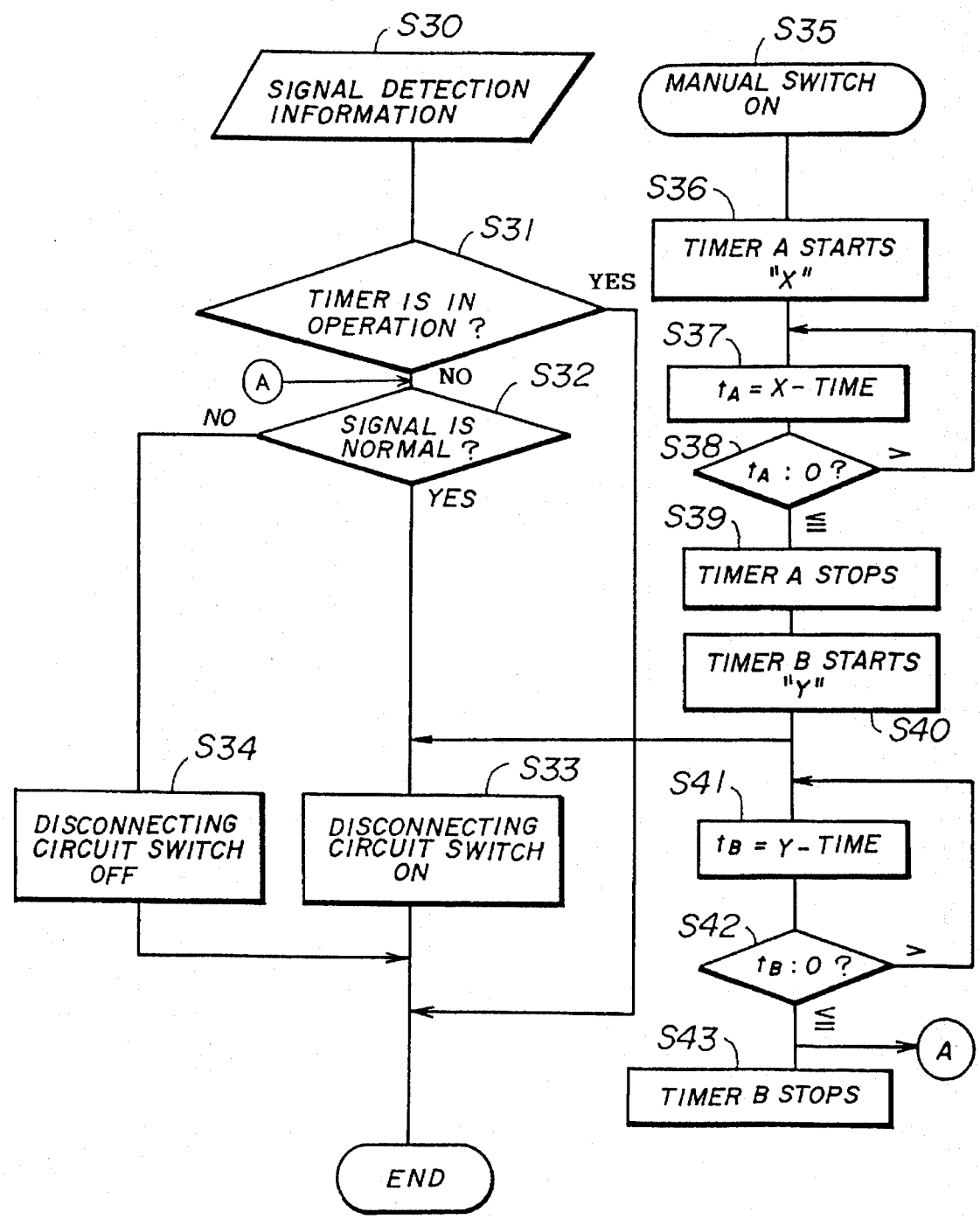
FIG. 6B shows a flowchart for explaining an operation of the optical signal transmission apparatus shown in FIG. 6A.

Next, a description will be given of a third embodiment of the optical signal transmission apparatus according to the present invention, by referring to FIGS. 6A, 6B. FIG. 6A shows a block diagram of the third embodiment of the optical signal transmission apparatus according to the present invention. FIG. 6B shows a flowchart for explaining an operation of the optical signal transmission apparatus shown in FIG. 6A. The optical signal transmission apparatus comprises an optical signal receiving section (not shown), an optical signal transmitting section 43, a signal processing section 45, a power supply section 46, a disconnecting circuit 47, a power supply control section 48, a manual radiation switch 50, and a manual radiation timer 51. The optical signal transmitting section 43 comprises an electrical-to-optical converter section 44. The apparatus further comprises a manual radiation start timer 52 and a manual radiation control section 53.

The third embodiment of the optical signal transmission apparatus is constructed by adding the manual radiation start timer 52 and the manual radiation control section 53 to the second embodiment thereof. In starting up the system and removing the abnormal condition, when the manual radiation switch 50 is turned on (step S35 in FIG. 6B), the manual radiation start timer 52 starts to operate (step S36). After a time "X" set in the manual radiation start timer 52 passes (steps S37, S38, S39), the manual radiation timer 51 is operated (step S40) by the manual radiation control section 53 and the optical signal starts to be transmitted (step S33). The optical signal continues to be transmitted during the interval "Y" set in the manual radiation timer 51. The time "X" of the manual radiation start timer 52 is set, for example, taking a time necessary for confirming the condition of the opposite station into account.

Figure 7A:
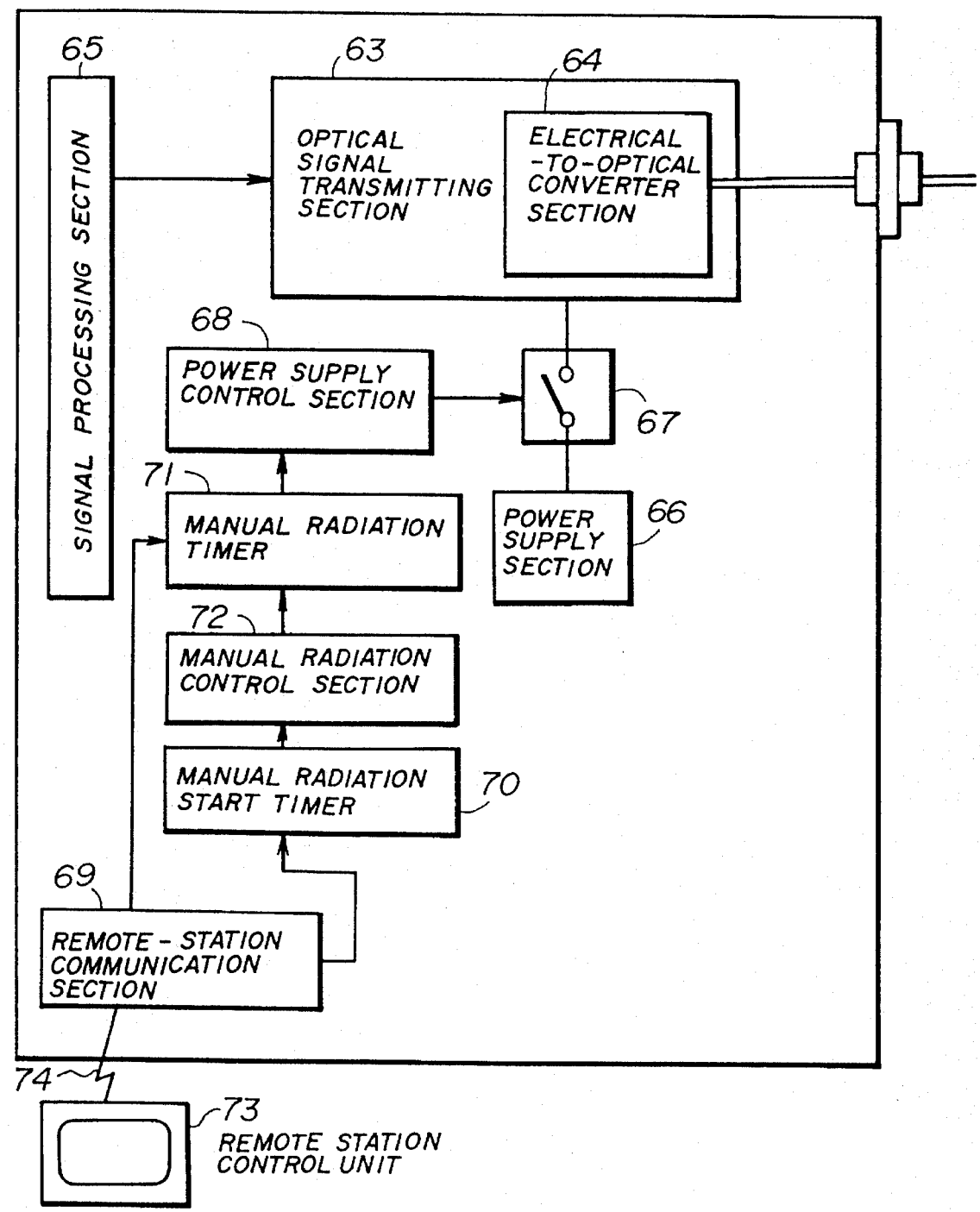
FIG. 7A shows a block diagram of a fourth embodiment of the optical signal transmission apparatus according to the present invention.
Figure 7B:
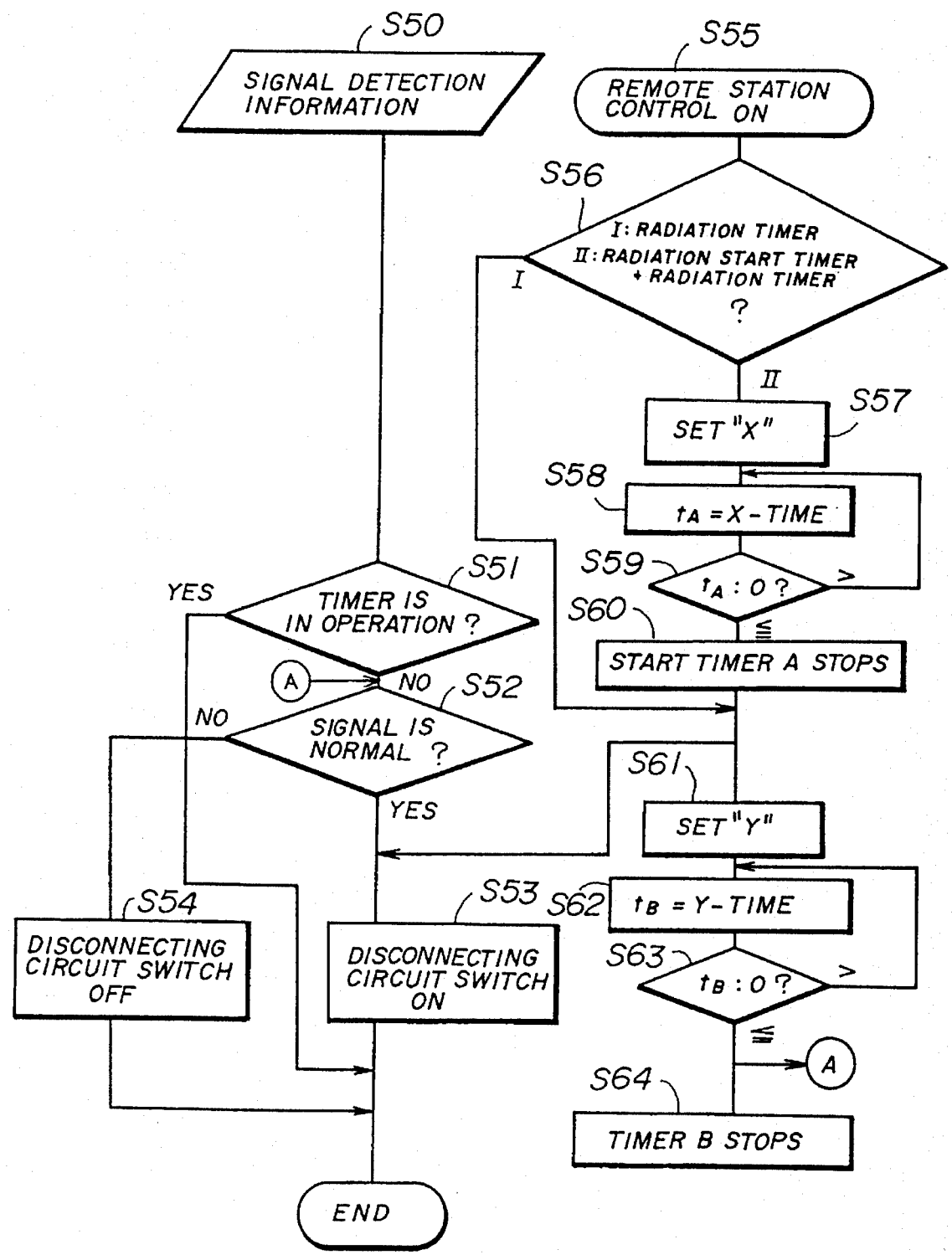
FIG. 7B shows a flowchart for explaining an operation of the optical signal transmission apparatus shown in FIG. 7A.

Next, a description will be given of a fourth embodiment of the optical signal transmission apparatus according to the present invention, by referring to FIGS. 7A, 7B. FIG. 7A shows a block diagram of the fourth embodiment of the optical signal transmission apparatus according to the present invention. FIG. 7B shows a flowchart for explaining an operation of the optical signal transmission apparatus shown in FIG. 7A. The optical signal transmission apparatus comprises an optical signal receiving section (not shown), an optical signal transmitting section 63, a signal processing section 65, a power supply section 66, a disconnecting circuit 67, a power supply control section 68, a manual radiation start timer 70, a manual radiation timer 71, and a manual radiation control section 72. The optical signal transmitting section 63 comprises an electrical-to-optical converter section 64. The apparatus further comprises a remote-station communication section 69, and is connected with a remote-station control unit 73 through a communication line 74.

The fourth embodiment of the optical signal transmission apparatus is constructed by adding the remote-station communication section 69 and the remote-station control unit 73 to the third embodiment thereof shown in FIG. 6A. The remote-station communication section 69 starts an operation of the manual radiation timer 71 (I of step S56 in FIG. 7B) or the manual radiation start timer 70 (II of step S56 in FIG. 7B) by communicating with the remote station. In the remote station, for example, managing and supervising the optical signal transmission system including the optical signal transmission apparatus are performed. From the control unit 73 in the remote station, when starting the system or restoring the abnormal condition, a signal for starting the manual radiation timer 71 or the manual radiation start timer 70 is transmitted to this station through the communication line 74.

For example, when starting the manual radiation timer 71, the optical signal may start to be transmitted in the same way as that of the embodiment shown in FIG. 5A. When starting the manual radiation start timer 70, the optical signal may start to be transmitted after the set time of the manual radiation start timer 70 in the same way as that of the embodiment shown in FIG. 6A.

Figure 8:
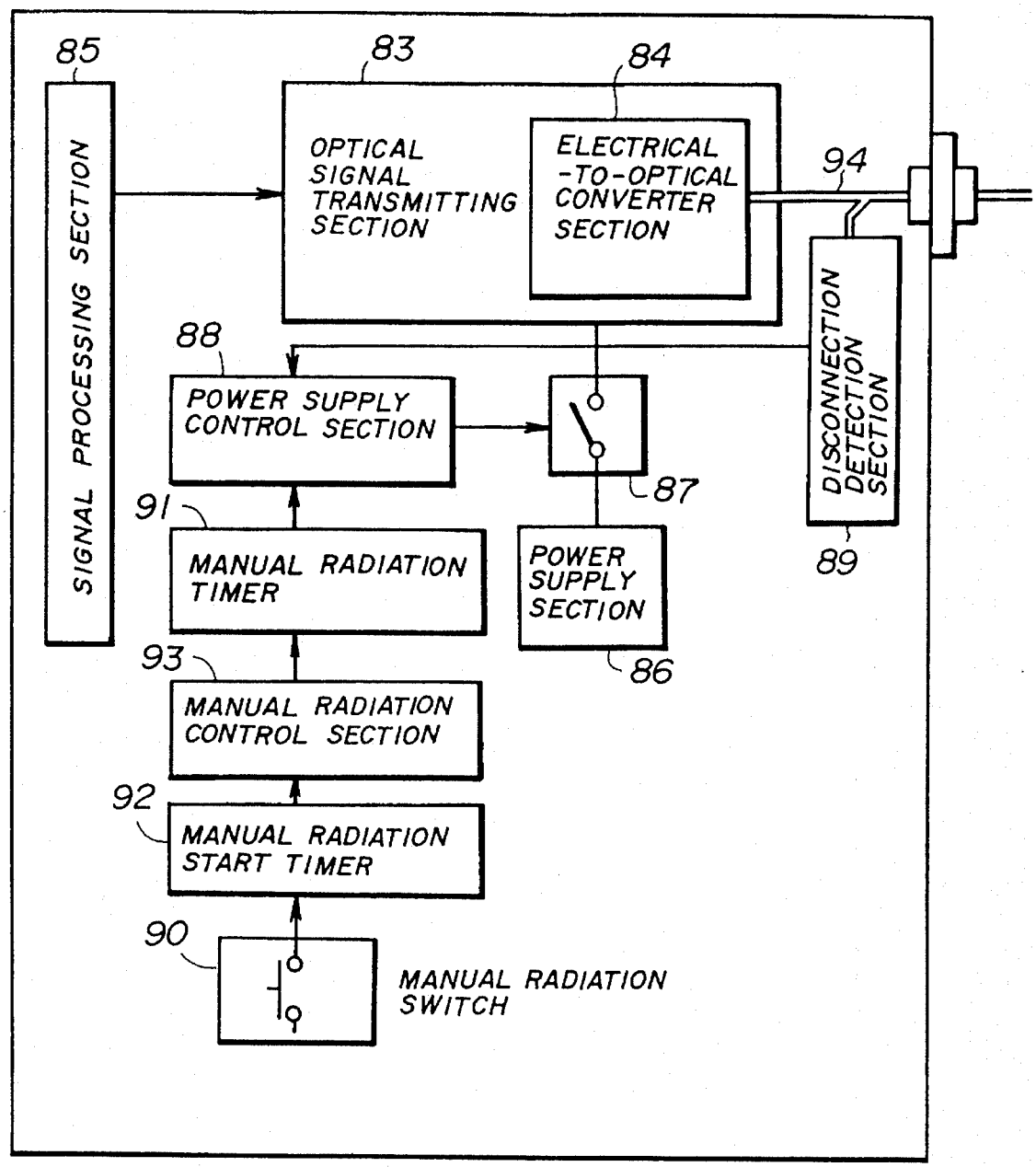
FIG. 8 shows a block diagram of a fifth embodiment of the optical signal transmission apparatus according to the present invention.

Next, a description will be given of a fifth embodiment of the optical signal transmission apparatus according to the present invention, by referring to FIG. 8. FIG. 8 shows a block diagram of the fifth embodiment of the optical signal transmission apparatus according to the present invention. The optical signal transmission apparatus comprises an optical signal receiving section (not shown), an optical signal transmitting section 83, a signal processing section 85, a power supply section 86, a disconnecting circuit 87, a power supply control section 88, a manual radiation switch 90, a manual radiation timer 91, a manual radiation start timer 92, and a manual radiation control section 93. The optical signal transmitting section 83 comprises an electrical-to-optical converter section 84. The apparatus further comprises a disconnection detection section 89 and an optical coupler 94.

In this embodiment, the disconnection detection section 89 detects a reflected light component from the receive side of the optical cable connected to the optical signal transmitting section 83. The optical signal converted by the electrical-to-optical converter section 84 is applied to the optical cable and is transmitted to the receive side of the opposite station. A part of the optical signal is reflected in the connecting part of the connectors, etc., or is reflected on the optical cable itself. When the optical cable is in the normal condition without the disconnection, the reflected light component is very small. However, when the disconnecting of the optical cable is caused, a cross-sectional face in the disconnected part seems to be a mirror, and most of the optical signal is reflected. Therefore, by detecting the reflected light component, the disconnecting of the optical cable may be detected.

A detected signal indicating the disconnection of the optical cable from the disconnection detection section 89 is supplied to the power supply control section 88. And the power supply control section 88 controls the disconnecting circuit 87 to be in the disconnecting condition. As a result, the optical signal transmitting section 83 stops operating, and the optical signal from the electrical-to-optical converter section 84 stops being transmitted. Therefore, the radiation of the invisible optical signal from the disconnected part of the optical cable stops, so that the humans and animals are prevented from being in danger.

In removing the abnormal condition by repairing the disconnection of the optical cable or in starting the system to operate, when the manual radiation switch 90 is turned on, the manual radiation start timer 92 is started. After the set time of the manual radiation start timer 92 passes, the manual radiation timer 91 is started by the manual radiation control section 93, and the disconnecting circuit 87 is controlled to be in the connecting condition by the power supply control section 88. Then, the operating power from the power supply section 86 is supplied to the optical signal transmitting section 83, and the optical signal is transmitted to the opposite station through the optical cable. As a result, from the opposite station, the optical signal is transmitted to the station on this side. Namely, it becomes the normal condition that the optical signals are transmitted to each other.

Further, the present invention is not limited to these embodiments, but various variations and modifications may be made without departing from the scope of the present invention. For example, instead of the disconnecting circuits 7, 17, 27, 47, 67, 87, optical shutters such as a liquid crystal shutter may be located between the electrical-to-optical converter sections 4, 14, 24, 44, 64, 84 and the optical cable. When the abnormal condition of the optical signal is detected, the optical signal transmitted to the optical cable may be interrupted by the optical shutter. Instead of stopping the power supply to the optical signal transmitting sections 3, 13, 23, 43, 63, 83 by the disconnecting circuits 7, 17, 27, 47, 67, 87, it is possible to stop supplying bias voltages to the electrical-to-optical converter sections 4, 14, 24, 44, 64, 84 having the semiconductor lasers, etc.

The present invention may be applied for bidirectional communication system such as telephone communication and data communication using the optical cables. FIG. 9 shows an example of a configuration of an optical subscriber transmission system. In this case, the optical signal transmission apparatus mentioned above is located in a subscriber side (optical network unit in FIG. 9) and a switching station side (optical line termination equipment in FIG. 9), which are connected to each other with the optical cables (passive optical network in FIG. 9). Further, it is possible to configure the optical signal transmission apparatus combining the above-mentioned embodiments.

The manual radiation timer and the manual radiation start timer, etc., may be constructed with a soft-timer by a microprocessor, etc. The power supply control sections 8, 18, 28, 48, 68, 88 may be realized by processing functions of the microprocessor. In this case, in the power supply control sections, determining the disconnection of the optical cable and the trouble in the opposite station may be performed.

As described above, the present inventions have the following features.

According to the present invention, in the optical signal transmission apparatus including the optical signal receiving section 1, the optical signal transmitting section 3, and the signal processing section 5, the operating power from the power supply section 6 is supplied to the optical signal transmitting section 3. When the signal detection section 9 and the disconnection detection section 89 detect the disconnection of the optical cable and the abnormal condition of the opposite station, the transmission of the optical signal from the optical signal transmitting section 3 is stopped. Therefore, the radiation of the invisible optical signal from the disconnected part of the optical cable stops, so that the humans and animals are prevented from being in danger. In this case, to stop transmitting the optical signal, the shutting by the optical shutter, interrupting the bias voltage, and interrupting the operating power, etc., are usable. When the apparatus is constructed such that the radiation of the optical signal from the electrical-to-optical converter section 4 is stopped by controlling the disconnecting circuit 7 to be in the disconnecting condition with the power supply control section 8, there are advantages that the control is easy and the optical signal can surely stop being transmitted.

According to the optical signal transmission apparatus including the manual radiation switch, when starting the system and after removing the abnormal condition, the manual radiation switch is turned on. The disconnecting circuit 7 is controlled to be in the connecting condition by the power supply control section 8, and the operating power from the power supply section 6 is supplied to the optical signal transmitting section 3. As a result, the optical signal is radiated from the electrical-to-optical converter section 4, and is transmitted to the opposite station. Therefore, there are advantages that radiation is automatically stopped when the abnormal condition occurs, and the procedures for starting the optical signal transmission may be simplified.

According to the optical signal transmission apparatus including the manual radiation timer, the manual radiation start timer, and the manual radiation control section, etc., the procedures for staring the optical signal transmission by use of the manual radiation switch may be more simplified.

By locating the communication section in the optical signal transmission apparatus to perform a remote control from the remote station, the maintenance of distributed optical signal transmission apparatus may be easily carried out.

By locating a reflected light detecting means in the optical signal transmission apparatus, the disconnection of the optical cable may be surely detected to stop radiating the optical signal, so that the humans and animals may be prevented from being in danger.

In the bidirectional communication system such as telephone communication and data communication between the subscriber and the networks, when the abnormal condition of the optical signal in one direction is detected, the optical signal in the other direction is also automatically stopped. In this case, only one bidirectional communication for one subscriber stops. Therefore, without effecting other communication, it may ensure safety of the maintenance worker, etc., by stopping radiation of the invisible optical signal.

What is claimed is:

1. An optical signal transmission apparatus comprising:

an optical signal receiving section arranged for receiving a first optical signal through a first optical cable;

an optical signal transmitting section arranged for transmitting a second optical signal through a second optical cable;

control means for stopping said optical signal transmitting section from transmitting said second optical signal when an abnormal condition in said first optical signal is detected; and restart control means for allowing a maintenance worker to restart transmission of said second optical signal by said optical signal transmitting section, even if said abnormal condition in said first optical signal is not restored when the second optical signal needs to be transmitted to the first station.

2. The apparatus as claimed in claim 1, wherein said control means comprises:

a disconnecting circuit interrupting power supplied to said optical signal transmitting section; and a power supply control section controlling said disconnecting circuit to interrupt said power to the optical signal transmitting section to stop transmitting said second optical signal when said abnormal condition of said first optical signal is detected.

3. The apparatus as claimed in claim 2, wherein said control means further comprises a signal detection section detecting said abnormal condition of said first optical signal.

4. The apparatus as claimed in claim 3, wherein said restart means comprises a radiation switch operable to control said disconnecting circuit to supply said power to the optical signal transmitting section when said second optical signal needs to be transmitted.

5. The apparatus as claimed in claim 4, wherein said restart means further comprises a radiation timer maintaining a connecting condition in said disconnecting circuit for a given first time.

6. The apparatus as claimed in claim 5, wherein said restart means further comprises:

a radiation start timer starting said connecting condition in said disconnecting circuit after a given second time; and a radiation control section starting said radiation timer in response to time out of said radiation start timer.

7. The apparatus as claimed in claim 5, wherein said restart means further comprises a remote communication section remote-controlling said radiation timer.

8. The apparatus as claimed in claim 6, wherein said restart means further comprises a remote communication section remote-controlling said radiation start timer.

9. The apparatus as claimed in claim 2, wherein said control means further comprises a reflection detection section detecting a reflected light component from said second optical cable; wherein said power supply control section controls said disconnecting circuit to interrupt said power to the optical signal transmitting section to stop transmitting said second optical signal when a level of the reflected light component detected in the reflection detection section is equal to or larger than a given reflection value.

10. The apparatus as claimed in claim 1, wherein said apparatus is located in one of a subscriber side and a network side of a transmission system which performs bidirectional communication through a plurality of optical cables between the subscriber and the network.

11. A method of transmitting a first optical signal from a first station to a second station through a first optical cable and transmitting a second optical signal from the second station to the first station through a second optical signal from the second station to the first station through a second optical cable, said method comprising the steps of:

(a) stopping said second station from transmitting the second optical signal to the first station when an abnormal condition in the first optical signal is detected in the second station;

(b) stopping said first station from transmitting the first optical signal to the second station when an abnormal condition in the second optical signal is detected in the first station;

(c) manually restarting said second station to transmit the second optical signal first station even if said abnormal condition in the first optical signal is not restored when the second optical signal needs to be transmitted to the first station; and (d) starting said first station to transmit the first optical signal to the second station when no abnormal condition in the second optical signal is detected in the first station.

12. The method as claimed in claim 11, wherein said step (c) comprises a step of controlling said first station to transmit manually the first optical signal to the second station for a given period.

13. An optical signal transmission apparatus comprising:

an optical signal receiving section for receiving a first optical signal through a first optical cable;

an optical signal transmitting section for transmitting a second optical signal through a second optical cable; and control means for stopping said optical signal transmitting section from transmitting said second optical signal when an abnormal condition in said first optical signal is detected, said control means comprising:

a disconnecting circuit for interrupting power supplied to said optical signal transmitting section;

a power supply control section for controlling said disconnecting circuit to interrupt said power to the optical signal transmitting section to stop transmitting said second optical signal when said abnormal condition of said first optical signal is detected; and restart control means including a manually operated a radiation timer, coupled to said power supply control section for maintaining a connecting condition in said disconnecting circuit for a given first time.

14. The apparatus as claimed in claim 13, wherein said control means further comprises:

a radiation start timer for starting said connecting condition in said disconnecting circuit after a given second time; and a radiation control section for starting said radiation timer in response to time out of said radiation start timer.

15. The apparatus as claimed in claim 13, wherein said control means further comprises a remote communication section for remote-controlling said radiation timer.

16. The apparatus as claimed in claim 14, wherein said control means further comprises a remote communication section for remote-controlling said radiation start timer.

17. An optical signal transmission apparatus comprising:

an optical signal receiving section for receiving a first optical signal through a first optical cable;

an optical signal transmitting section for transmitting a second optical signal through a second optical cable; and control means for stopping said optical signal transmitting section from transmitting said second optical signal when an abnormal condition in said first optical signal is detected, said control means comprising:

a disconnecting circuit for interrupting power supplied to said optical signal transmitting section;

a power supply control section for controlling said disconnecting circuit to interrupt said power to the optical signal transmitting section to stop transmitting said second optical signal when said abnormal condition of said first optical signal is detected; and a reflection detection section detecting a reflected light component from said second optical cable, wherein said power supply control section controls said disconnecting circuit to interrupt said power to the optical signal transmitting section to stop transmitting said second optical signal when a level of the reflected light component detected in the reflection detection section is equal to or larger than a given reflection value.

* * * * *